United States Patent

Pepper

[15] 3,643,333
[45] Feb. 22, 1972

[54] NAVIGATIONAL COURSE COMPUTER AND PLOTTER

[72] Inventor: Peter W. Pepper, 8899 Beverly Blvd., Los Angeles, Calif. 90048

[22] Filed: Mar. 30, 1970
[21] Appl. No.: 23,559

[52] U.S. Cl. ....................................................................33/1
[51] Int. Cl. ........................................................G01c 21/20
[58] Field of Search ..................33/1 SD, 76 VA; 235/61 GM

[56] References Cited

UNITED STATES PATENTS

| 1,896,997 | 2/1933 | Bennett | 33/76 |
| 2,364,731 | 12/1944 | Luck | 343/112 |
| 2,235,177 | 3/1941 | Stark | 33/1 |
| 3,094,781 | 6/1963 | Vangor | 33/1 |
| 3,373,493 | 3/1968 | McDonald | 33/1 |
| 3,540,127 | 11/1970 | Kane | 33/1 |

FOREIGN PATENTS OR APPLICATIONS 123,886  1/1949  Sweden

Primary Examiner—Robert B. Hull
Attorney—Fulwider, Patton, Rieber, Lee & Utecht

[57] ABSTRACT

A navigational course computer and plotter for a boat utilizes a base member that receives a navigational chart and is imprinted with a compass rose. Three transparent discs are mounted for rotation relative to the base member on a common vertical axis. Each of the discs is imprinted with sets of spaced parallel lines. Two of the discs are manipulated to diagram a fix of the boat's location when used with a radio direction finder or the like. The third disc is employed to indicate the course to be followed from the fixed position to a desired destination.

8 Claims, 8 Drawing Figures

INVENTOR.
PETER W. PEPPER

PATENTED FEB 22 1972 3,643,333

INVENTOR.
PETER W. PEPPER

BY Fulwider, Patton, Rieber,
Lee and Utecht
ATTORNEYS

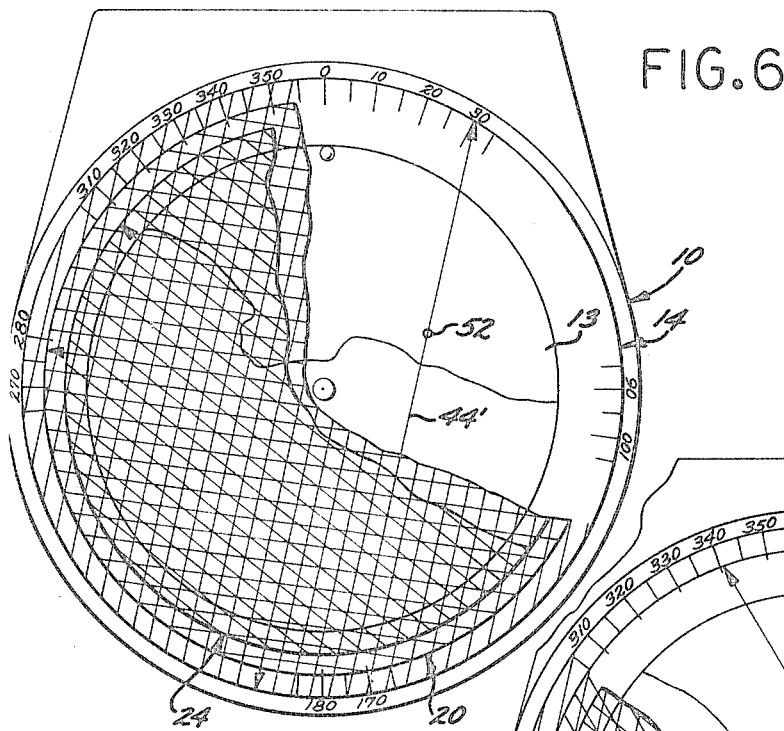
FIG. 6
FIG. 7
FIG. 8
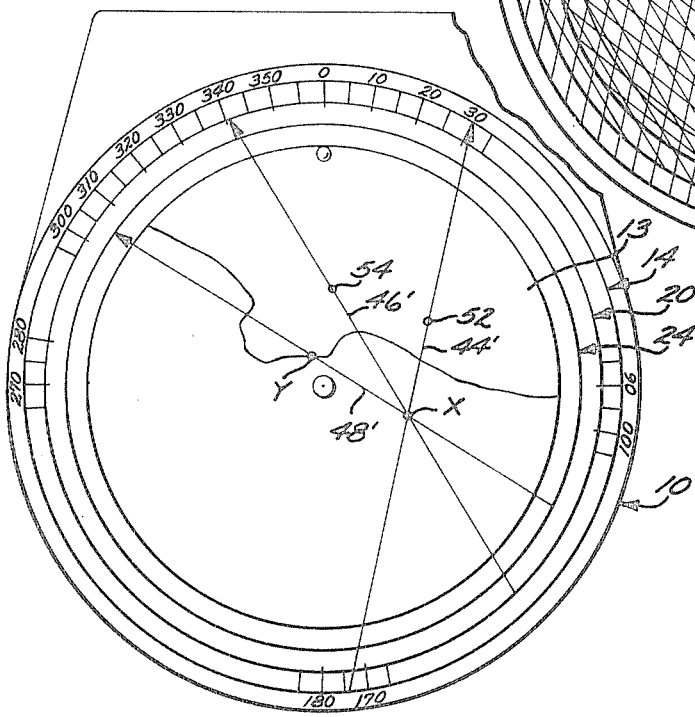
INVENTOR.
PETE W. PEPPER
BY Fulwider, Patton, Bieber, Lee and Utecht
ATTORNEYS

NAVIGATIONAL COURSE COMPUTER AND PLOTTER

BACKGROUND OF THE INVENTION

Field of the Invention

The present invention relates generally to navigational devices and more particularly to a novel course computer and plotter.

SUMMARY OF THE INVENTION

The navigational course computer and plotter of the present invention provides a navigational aid which pictorially illustrates the position of a boat on a chart when a fix of the boat's position is made. The fix may be obtained by the use of conventional navigational aids, such as a radio direction finder, navigational lights or landmarks. The navigational course computer employs a chart of the local waters and this chart may be readily replaced depending upon the boat's geographical location. By the use of the computer of the present invention, a navigator can eliminate the time-consuming use of conventional parallel rulers and callipers. Once the boat's location has been fixed on the chart, the compass course to be followed by the boat to reach a desired destination may be readily obtained. The dual operations of obtaining a fix and computing the boat's course to its destination may be accomplished rapidly even by a boating novice.

It is an important object of the present invention to provide a navigational course computer and plotter of the aforedescribed nature which is economical in construction, extremely compact and capable of affording a long and useful service life.

DESCRIPTION OF THE DRAWINGS

FIGS. 6, 7 and 8 are diagrammatic views in reduced scale showing the use of said device.

DESCRIPTION OF THE PREFERRED EMBODIMENT

Figure 1:
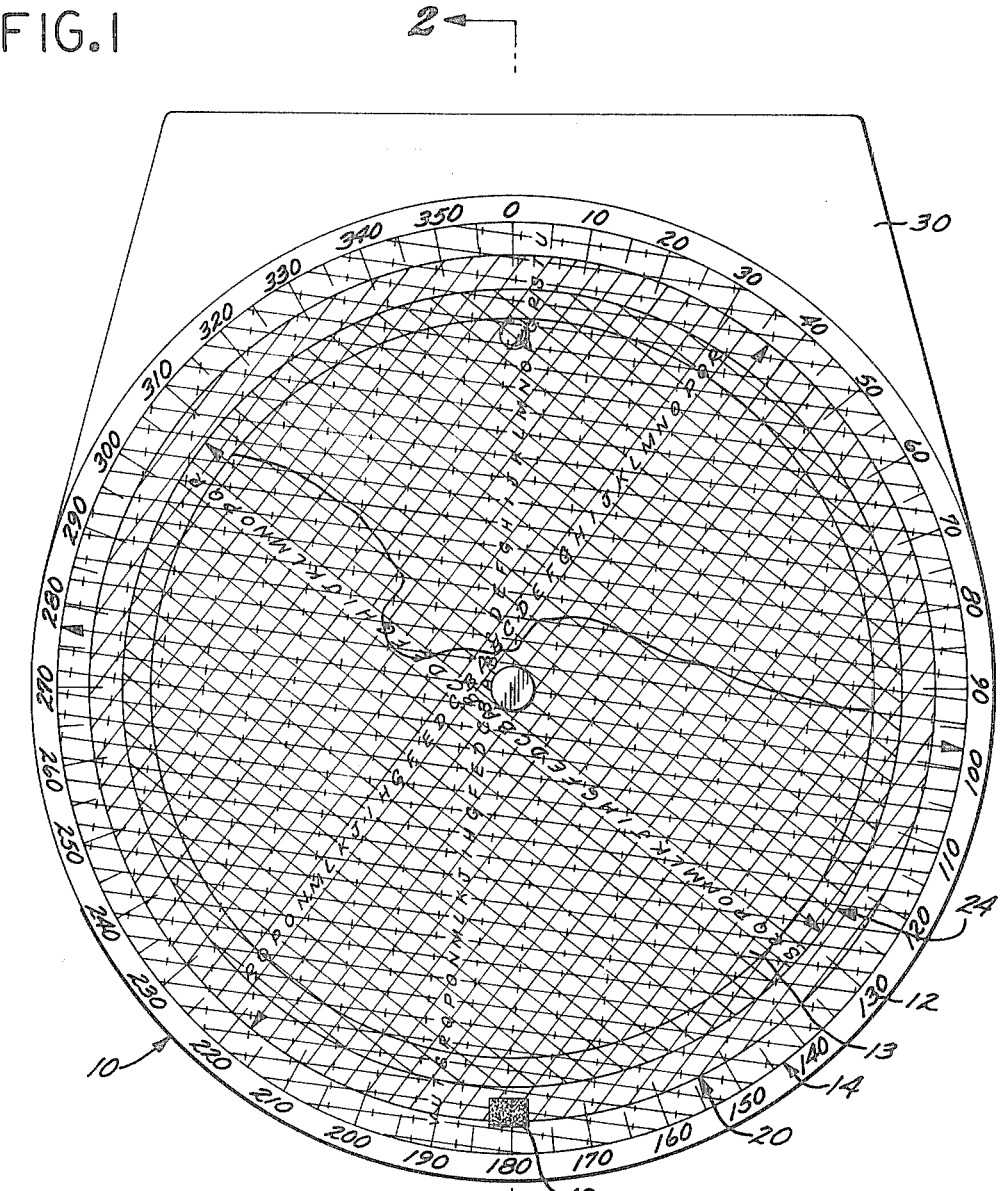
FIG. 1 is a top plan view of a preferred form of navigational course computer and plotter embodying the present invention.
Figure 2:
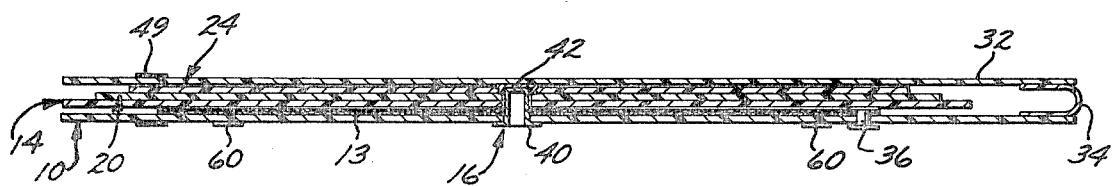
FIG. 2 is a vertical sectional view taken along line 2—2 of FIG. 1.

A preferred form of navigational course computer and plotter embodying the present invention includes a base member 10 that is imprinted with a compass rose 12 and supports a navigational chart 13. A first transparent disc 14 is mounted on the base member 10 by means of a snap fastener type of mounting pin member 16 for rotation relative to the base member. A second transparent disc 20 is also mounted for rotation relative to the base member and the first disc by snap fastener 16. A third transparent disc 24 is rotatably supported by the snap fastener 16 above the second disc 20 for rotation relative to the base member and the first and second discs. The three discs are each imprinted across their face with sets of parallel lines. The parallel lines of the first and second discs are utilized in conjunction with a navigational aid to first fix the location of a boat. Thereafter, the third disc is utilized to indicate the course to be followed by the boat in order to reach its destination as shown on the navigational chart 13.

Figure 3:
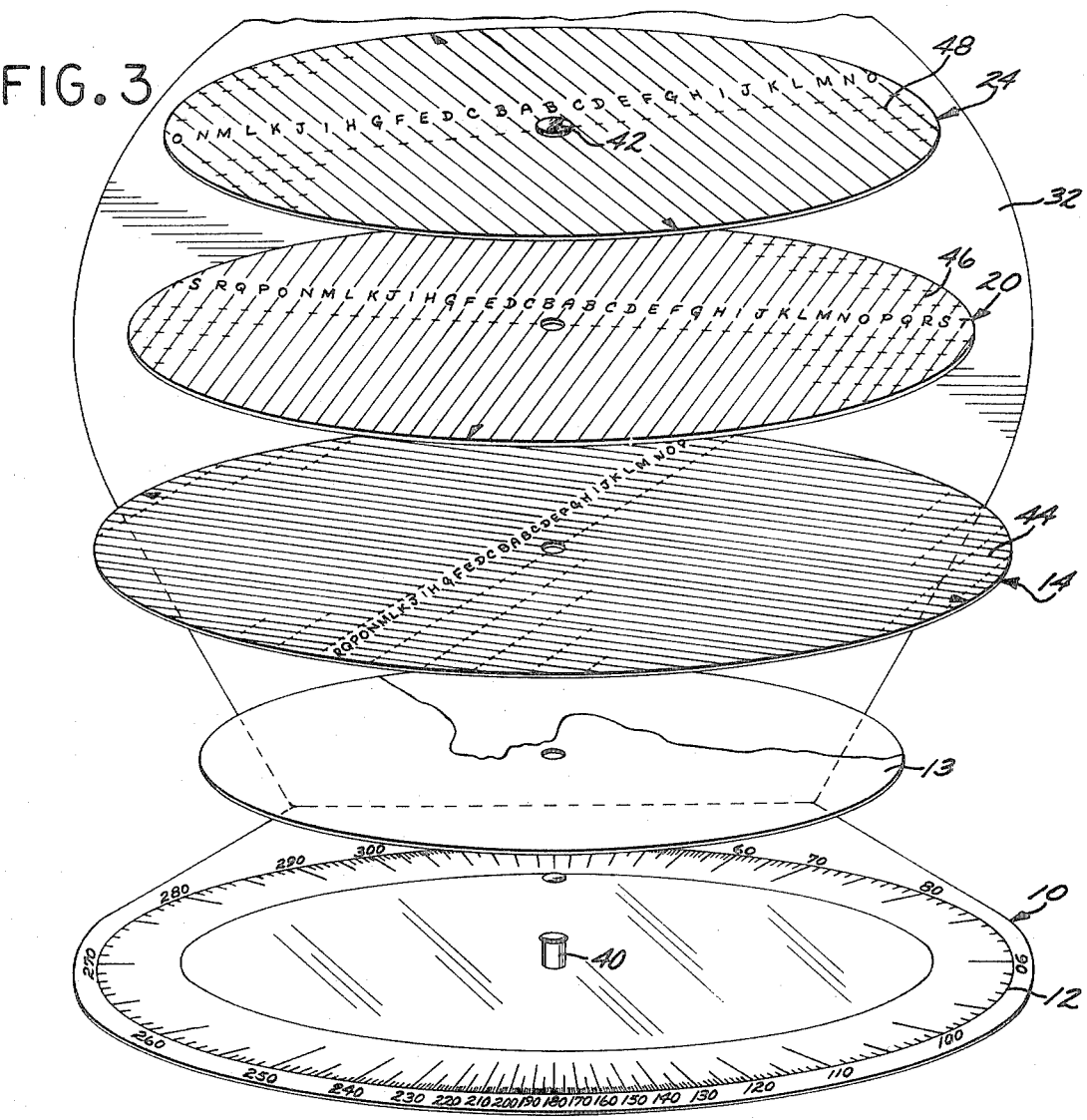
FIG. 3 is a vertically exploded view of said device.
Figure 4:
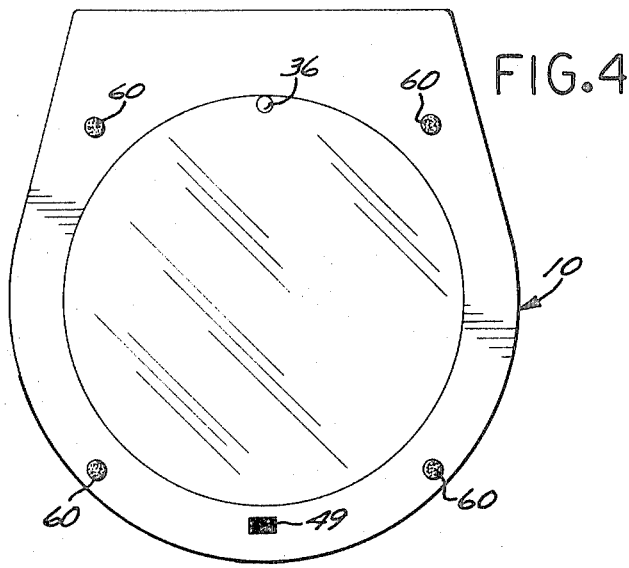
FIG. 4 is a bottom view of said device taken in reduced scale.

More particularly, the base member 10 and the first, second and third discs are each formed of a suitable clear synthetic plastic. The compass rose 12 is imprinted on the outer peripheral portion of the base member with the North or Zero reading at the top thereof. Preferably, the upper portion of the base member is formed with an ear 30. A marking overlay 32 of clear synthetic plastic is secured along the upper surface of the ear 30 by a plastic hinge 34 so as to be movable from a position disposed over the third disc 24 (FIG. 1) and an open position (FIG. 3).

Figure 5:
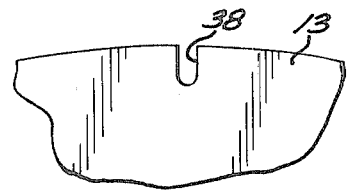
FIG. 5 is a fragmentary view showing a detail of said device.

The navigational chart 13 may be cut from a conventional chart so as to fit within the diameter of the compass rose 12. The chart will be secured upon the surface of the base member 10 by the snap fastener 16. An indexing peg 36 extends upwardly through the base member 10 into a complementary slot 38 formed on the top of the chart 13 (FIG. 5) so as to align the North or Zero reading of the chart with that of the compass rose 12.

The base member 10 is formed with a central opening through which extends the male element 40 of the snap fastener 16. Male element 40 frictionally receives a complementary female element 42 secured to the center of the upper disc 24. This arrangement permits the three discs to be readily removed from the base member 10 when it is desired to replace the navigational chart 13 with a chart showing a different geographical location.

The first transparent disc 14 is formed with a central opening that receives the male element 40 of the snap fastener 16. The spaced parallel lines 44 are imprinted across the face of the first disc in a first color. It has been found that where the diameter of this first disc 14 approximates 17 inches, the first set of parallel lines 44 should be spaced apart approximately one-half inch.

The second transparent disc 20 is also centrally formed with an aperture through which extends the male element 40 of the snap fastener 16. Conveniently, the diameter of the second disc is less than that of the first disc, as for example, approximately 16 inches. Also, it is desirable that the second set of spaced lines 46 is imprinted across the face of the second disc in a color other than that used to define the first set of lines 44 of the first disc 14. The spacing of the second set of lines 46 should approximate the spacing of the first set of lines 44.

The third transparent disc 24 is formed with a central aperture through which extends the male element 42 of the snap fastener 16. Conveniently, the diameter of the third disc 42 will be less than that of the second disc 20, by way of example, approximately 15 inches. It is desirable that the third set of spaced parallel lines 48 by imprinted across the face of the third disc in a color differing from the colors utilized to define the first and second set of lines. The spacing of the third set of lines 48 approximates the spacing of the first and second sets of lines.

In the use of the navigational course computer and plotter of the present invention, the overlay 32 will preferably be raised to its open position. If desired, the overlay 32 may be retained against the underside of base member 10 as by means of a Velcro fastener 49. Thereafter, the navigator will locate a navigational aid on the chart 13. By way of example, referring to FIG. 6, the navigator can locate a shore-based radio station, shown on the chart 13 at point 52, by means of a conventional radio direction finder. The first disc 14 will then be rotated so that one of the first set of lines thereon will extend through or parallel to such radio station 52. By way of example, the radio direction finder in FIG. 6 has located the radio station 52 as being on a bearing of 30°. Accordingly, the first disc 14 has been rotated until one of the lines thereon 44' extends through the radio station 52 on a bearing of 30° relative to compass rose 12. In FIG. 6, the lines 44 other than 44' have been deleted in the interest of clarity.

Referring now to FIG. 7, the navigator will next take a radio direction finder bearing on a second radio station shown at point 54 on the chart 13. Thereafter, the second disc 20 will be rotated until one of the lines 46 thereof extends through or parallel to such radio station on the chart 13. In FIG. 7 this line is designated 46' and extends at a bearing of 340° relative to compass rose 12. Note that in this figure the lines 44 and 46 other than lines 44' and 46' have been deleted for clarity. The point where the line 44' of the first disc 14 intersects the line 46' of the second disc 20 fixes the location of the boat on the chart 13 at point X.

After the navigator has located the fix of the boat on the chart 13 at point X he next desires an indication of the compass course to be followed by the boat in order to reach a desired destination Y shown on the chart 13. This is readily accomplished by merely rotating the third disc 24 so that one of the set of lines 48 thereof extends between the fix point X of the boat and the desired destination on the chart 13 or parallel thereto. Thus, referring to FIG. 8, assuming the navigator wishes to make a landfall at point Y on the chart 13, he will rotate the third disc 24 until the line 48' thereof extends between the fix point X and the desired destination point Y. The navigator then follows the line 48' to its intersection with the compass rose 12 and reads off the indicated compass heading so as to plot his course. In FIG. 8, this heading is approximately 305°. Note that lines 44, 46 and 48 except for the lines 44', 46' and 48' have been deleted in the interest of clarity.

It is possible to note the position of the boat at point X on the marking overlay 32 by means of an erasable marking substance, such as a grease pencil. Additionally, the plotting of the course being followed may be marked on such overlay. In this manner, visual progress of the track being made by the boat can be obtained.

It should be noted that various navigational aids other than radio stations may be employed, as for example, natural or manmade landmarks, navigational lights and so forth. Additionally, instead of a radio direction finder, the navigator may employ omni or other electronic aids to assist in determination of boat positions. The computer of the present invention may be used without cutting out sections of navigational charts. This is achieved by securing paper-gripping frictional devices such as cork grippers 60, suction cups or retractible miniature pins to the underside of the base member so as to permit the base member to be temporarily affixed over the desired portion of a conventional navigational chart, with the compass rose of such chart in alignment with the compass rose 12 of the base member. The computer of the present invention could also be incorporated into a mechanically actuated device wherein the three discs would be rotated by mechanical means in order to determine the boat's position and compute its course.

It will be apparent the computer of the present invention may be utilized by the navigator of an aircraft or other vehicle as well as by a boat navigator. It will also be apparent that the computer of the present invention may be used to determine true courses and bearings as well as compass courses and bearings.

Other modifications and changes may be made without departing from the spirit of the present invention.

I claim:

1. A navigational course computer for a boat or the like, comprising:

a base member that receives a navigational chart and is imprinted with a compass rose;

a first transparent disc imprinted across its face with a first set of spaced parallel lines and mounted upon said base member for rotation relative to said base member whereby said first set of lines may be aligned parallel with a navigational aid;

a second transparent disc imprinted across its face with a second set of spaced parallel lines and mounted upon said base member for rotation relative thereto about the same axis as said first disc whereby said second set of lines may be aligned parallel to a second navigational aid, with the intersection of one line of said first set of lines which passes through a first selected point on said chart and one line of said second set of lines which passes through a second selected point on said chart indicating the location of said boat upon said chart; and a third transparent disc imprinted across its face with a third set of spaced parallel lines and mounted upon said base member for rotation relative thereto about the same axis as said first and second discs whereby one of said third set of lines may be extended through said boat location on said chart and the desired destination of said boat appearing on said chart, with the intersection of a diametral one of said third set of lines and said compass rose indicating the compass course to be followed by said boat in order to reach said destination.

2. A navigational course computer as set forth in claim 1 wherein said first, second and third set of lines are imprinted in three separate colors.

3. A navigational course computer as set forth in claim 1 wherein a transparent marking overlay is hingedly secured to said base member.

4. A navigational course computer as set forth in claim 1 wherein the area of said base member encompassed by said compass rose is transparent and the underside of said base member is provided with paper-gripping frictional members.

5. A navigational course computer as set forth in claim 1 wherein said discs and chart are removably secured to said base member by a removable fastener whereby said discs can be temporarily detached from said base member and said chart replaced with a chart showing a different geographical location.

6. A navigational course computer as set forth in claim 2 wherein a transparent marking overlay is hingedly secured to said base member.

7. A navigational course computer as set forth in claim 2 wherein the area of said base member encompassed by said compass rose is transparent and the underside of said base member is provided with paper-gripping frictional members.

8. A navigational course computer as set forth in claim 5 wherein said charts are formed with an indexing slot received by a complementary indexing peg carried by said base member.

* * * * *